United States Patent [19]

Yamamura et al.

[11] 4,384,808

[45] May 24, 1983

[54] UNDER-WATER CABLE BURYING DEVICE

[75] Inventors: Kazuomi Yamamura, Yokohama; Yoshinao Iwamoto, Fujimi; Hifumi Sakaguchi, Abiko; Kenichi Asakawa, Hachiohji, all of Japan

[73] Assignee: Kokusai Denshin Denwa Co., Ltd., Tokyo, Japan

[21] Appl. No.: 250,280

[22] Filed: Apr. 2, 1981

[30] Foreign Application Priority Data

Sep. 2, 1980 [JP] Japan .................. 55/120617

[51] Int. Cl.³ .............................................. F16L 1/04
[52] U.S. Cl. .................................. 405/160; 405/161
[58] Field of Search ................ 405/159, 161–163, 405/165, 174, 175, 166, 180, 160; 104/244.1; 180/131

[56] References Cited

U.S. PATENT DOCUMENTS

| | | | |
|---|---|---|---|
| 2,202,156 | 5/1940 | Lawton | 405/165 |
| 3,581,838 | 6/1971 | Rhodes | 104/244.1 X |
| 3,670,514 | 6/1972 | Breston et al. | 405/161 X |
| 3,724,584 | 4/1973 | Varichon | 104/244.1 X |
| 3,995,439 | 12/1976 | Halhbrock | 405/161 |
| 4,087,981 | 5/1978 | Norman | 405/161 |
| 4,234,268 | 11/1980 | Scodino | 405/158 |

*Primary Examiner*—Ernest R. Purser
*Assistant Examiner*—Nancy J. Pistel

[57] ABSTRACT

The present invention has an object to provide an underwater cable burying device which can accurately be guided to align with the cables in the process of burying even if the cables have to be re-buried. The device according to the present invention is characterized in that a travelling device is provided on the body of the device which is further provided with a trenching device at the middle portion thereof, that a cable clamp member and a cable engaging member are provided at an arm projecting forward from the said device body and that said respective devices are controlled through a control cable on the mother ship.

2 Claims, 5 Drawing Figures

UNDER-WATER CABLE BURYING DEVICE

BACKGROUND OF THE INVENTION

The present invention relates to an under-water cable burying device to bury under-water cable which are laid under-water in the sea bed.

The recent trend has been to construct cables buried in the sea bed or in the river bed so as to avoid breakage of cables caused by anchors of vessels or fish nets. In the prior art, a device having a sea-bed trenching device of either the plow type or the water jet type is towed by a mother ship to bury such cables. In such burying device of plow-type, when the cables carried upon the mother ship is laid and buried at the same time upon an under-water surface in a so-called simultaneous burying method, the operation can be conducted at a high efficiency; however, in a case the cable has a fault and after the faulty portion is pulled up on the ship for repairment, when the burying operation should be resumed, since both ends of the faulty portion have been already buried in sea bed and the positions thereof have been fixed, the burying device has to be guided accurately so as to align with the position from which the portion has been pulled up. This presents the necessity to provide a special ship with excellent operational performance on the waters where severe operational conditions prevail. In a shallow water, it is difficult to use a mother ship having a sufficient towing power.

SUMMARY OF THE INVENTION

The present invention aims at eliminating such drawbacks and has an object to provide an under-water cable burying device which can accurately be guided to align with the cable in the process of burying even if the cables have to be re-buried. The device according to the present invention is characterized in that a travelling device is provided on the body of the device which is further provided with a trenching device at the middle portion thereof, that a cable clamp member and a cable engaging member are provided at an arm projecting forward from the said device body and that said respective devices are controlled through a control cable on the mother ship. The device is further characterized in that the said cable clamp member comprises two semi-cylindrical claws which are supported on a supporting frame supported by the arm at the upper portion thereof and which close/open around a fulcrum by vertical sliding movement of a sliding member and that in the said cable clamp member the lower sides of the claws are formed horizontal, that a pressure board is provided on the said claws via a spring so as to rotate a potentiometer by the lateral sliding movement of the pressure board, that in said cable engaging member the sliding member which moves horizontally is engaged with the said arm and that a cable is inserted between a roller provided upon the said arm and a roller which is interlocked with the revolution of the driving motor.

DETAILED DESCRIPTION OF PREFFERED EMBODIMENT

Figure 1:
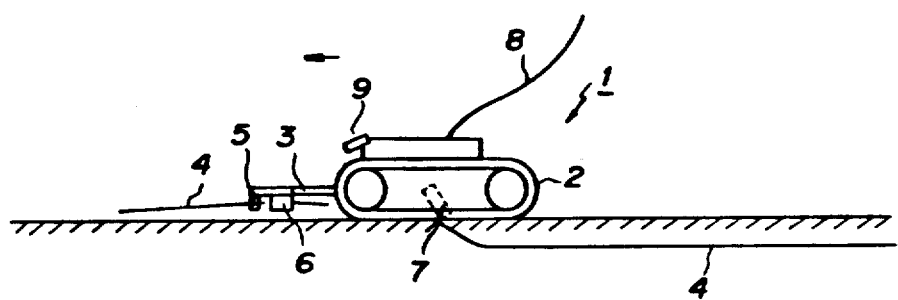
FIG. 1 is a side view to illustrate the whole structure of the burying device according to the present invention.

The underwater cable burying device according to the present invention is now described referring to preferred embodiments illustrated in attached drawings. In the attached drawings FIG. 1 indicates a whole structure (in a side view) of an underwater cable burying device according to the present invention wherein reference numeral 1 denotes a burying device which is made to travel on the sea bed by driving a travelling device 2, for instance, an endless track. At the front end of the burying device extends an arm 3 which is provided with a cable clamp member 5 to catch a cable 4 and a cable engaging member 6 while an trenching device of water jet type 7 is provided at the middle portion of the burying device. The electric energy (power) required for said devices 5, 6 and 7, and the travelling device 2 etc. and control signals therefor are supplied from the mother ship (not shown) via the control cable 8. The reference numeral 9 denotes an underwater TV camera.

The operation is conducted according to the following procedure.

The position of the cable 4 which is laid on the sea bed is confirmed through the underwater TV camera 9 aboard the mother ship in this embodiment. With the aid of the information thus obtained, the burying device 1 can approach close to the cable 4 by the travelling member 2 while simultaneously advancing toward the direction indicated by the arrow mark to catch the cable 4 with the cable clamp member 5. Then the device passes the cable 4 through the cable engaging member 6 and at the same time crushes sand and trenches the sea bed by the nozzle provided at the tip end of the trenching device of water-jet type to make trenches as well as to place and bury the cable 4 therein.

Figures 2A, 2B:
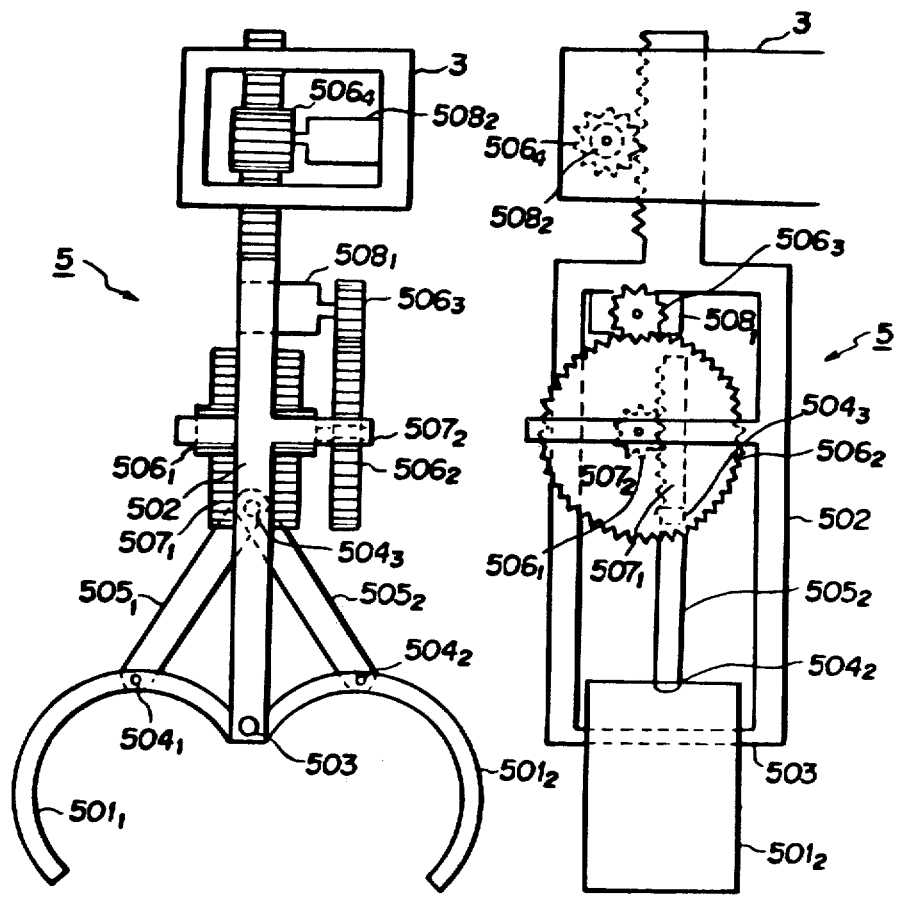
FIG. 2 illustrates one preferred embodiment of the cable clamp member of the burying device indicated in FIG. 1 wherein (a) is a frontal view and (b) a side view.
Figure 3A:
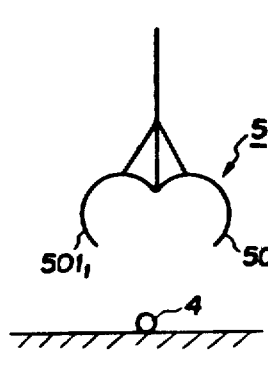
FIG. 3 is a view to explain the procedure to catch and clamp the cable.
Figure 3B:
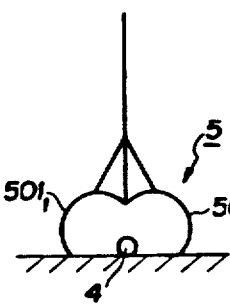
Figure 3C:
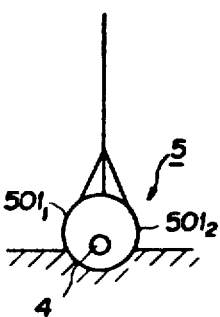
Figure 3D:
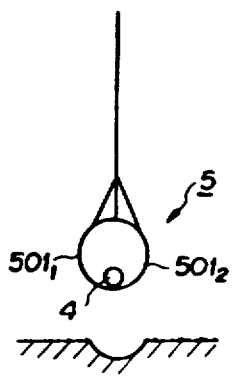

FIG. 2 indicates an embodiment of the cable clamp member of the burying device according to the present invention wherein FIG. 2(a) is the frontal view and FIG. 2(b) is the side view thereof. The cable 4 (not shown in FIG. 2) is caught in an embracing manner from both sides by the semi-cylindrical claws $501_1$ and $501_2$. The claws $501_1$ and $501_2$ are made to open/close around the fulcrum 503 fixed on the supporting frame 502. The claws $501_1$ and $501_2$ are provided with rods $505_1$ and $505_2$ through the fulcrums $504_1$ and $504_2$ which are freely rotatable. The rods $505_1$ and $505_2$ are connected to the sliding member $507_1$ which is slidable by the revolution of the gear $506_1$ through the freely rotatable fulcrum $504_3$. The sliding member is driven by the motor $508_1$ fixed upon the support frame 502 via the gears $506_2$ and $506_3$. In other words, the sliding member $507_1$ is slid vertically through the gears $506_3$, $506_2$ and $506_1$ when the motor $508_1$ starts operating, thereby opening/closing the claws $501_1$ and $501_2$ via the rods $505_1$ and $505_2$. The upper portion of the support frame 502 is supported by the arm 3 which extends forward from the burying device 1 and is slid vertically by the revolution of the motor $508_2$ and the gear $506_4$ which is interlocked thereto. Accordingly the support frame 502 is moved upward and downward by the revolution of the motor $508_2$ fixed on the arm 3, thereby simultaneously moving upward and downward the cable clamp claws $501_1$ and $501_2$ provided on the support frame 502. The revolution of the motors $508_1$ and $508_2$ is controlled from the mother ship through the control cable 8 connecting the mother ship to the burying device 1.

The operational procedure to clamp the cable 4 is now explained referring to FIG. 3. Based upon the information from the underwater TV camera 9 mounted in the burying device 1, the travelling device 2 of the burying device 1 is controlled so as to locate the cable clamp member 5 at a position immediately above the cable 4. (Refer to (a).) Then the gear $506_4$ is rotated by driving the motor $508_2$ as explained above referring to FIG. 2 to lower the cable clamp claws $501_1$ and $501_2$ downward toward the cable 4 (Refer to FIG. (b)). The sliding member $507_1$ is slid downward by driving the motor $508_1$ via the gears $506_3$, $506_2$ and $506_1$ so that the claws $501_1$ and $501_2$ can clamp and catch the cable 4 (Refer to FIG. (c)). By driving the gear $506_4$, the cable clamp claws $501_1$ and $501_2$ are raised upward to complete the catching operation (Refer to FIG. (d)).

Figure 4A:
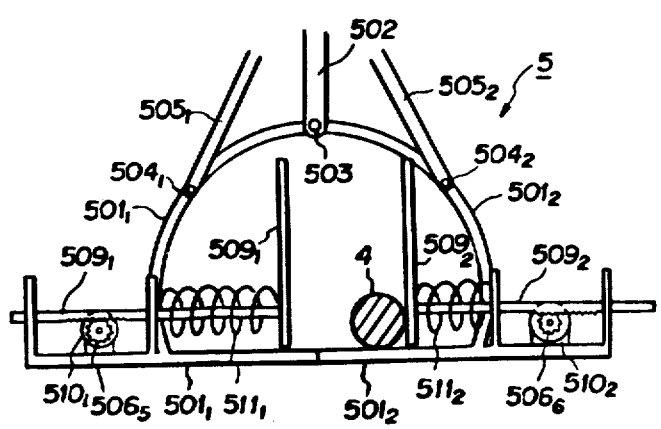
FIG. 4 illustrates another preferred embodiment of the cable clamp member of the burying device indicated in FIG. 1 wherein (a) is a frontal view and (b) a side view.
Figure 4B:
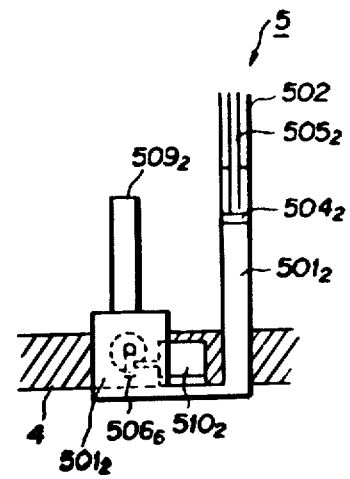

FIG. 4 shows another embodiment of the cable clamp member according to the present invention wherein FIG. (a) is a frontal view and FIG. (b) a side view to illustrate the condition where it has caught the cable 4. In this embodiment as is the case indicated in FIG. 2, the cable 4 is held in an embracing manner by the cable clamp claws $501_1$ and $501_2$ from both sides. The lower sides of the claws are shaped as substantially horizontal and the caught cable 4 is laterally movable between the two claws $501_1$ and $501_2$. In the embodiment, therefore, the travelling device 2 can be controlled so as to move the burying device 1 along the cable 4 by measuring the lateral displacement of the cable 4 and by assuming the direction to lay the cable 4.

The lateral displacement of the cable 4 can be detected by using the fact that the lateral displacement of the cable 4 makes the pressure board $509_1$ or $509_2$ slide either to the right or to the left so as to rotate the potentiometer $510_1$ and $510_2$ through the gear $506_5$ or $506_6$. More specifically, the pressure boards $509_1$ and $509_2$ are made by the bias of the springs $511_1$ and $511_2$ to locate close to the central points of the claws $501_1$ and $501_2$ which comprise the clamping member for the cable 4 when they are not pressed by the cable 4. The rotational angle of the potentiometers $510_1$ and $510_2$ is, therefore, determined by the amount of lateral displacement of the cable 4 and the displacement is readily converted to electric signals. The electric signals which express the lateral displacement of the cable 4 are transmitted to the mother ship via the control cable 8 to be used as the data for controlling the travelling device of the burying device 1.

Since the operational procedure to catch and clamp the cable in this embodiment is similar to that explained in respect of FIG. 2, and the identical parts of the members are denoted with identical reference numerals in both figures, the detailed explanation is omitted.

Figure 5A:
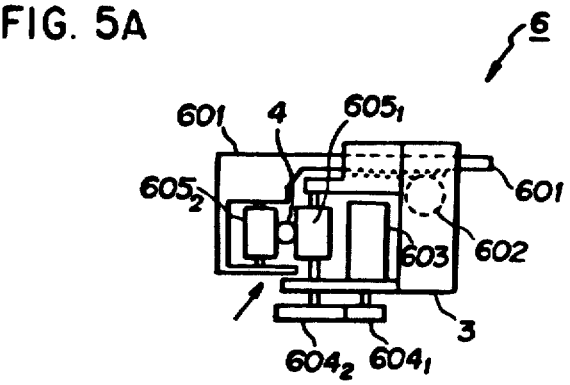
FIG. 5 shows a preferred embodiment of the cable engaging member of the burying device indicated in FIG. 1 wherein (a) is a frontal view and (b) a bottom view.
Figure 5B:
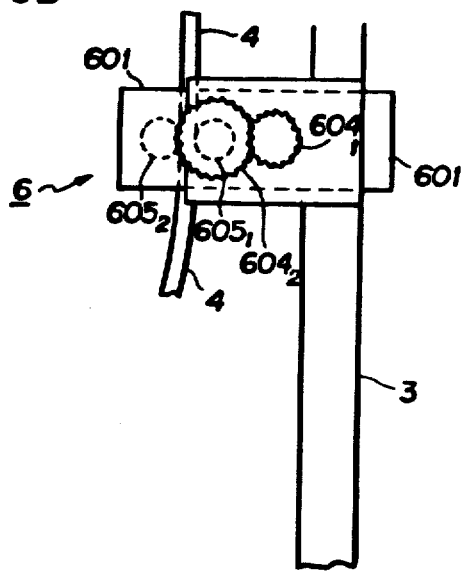

FIG. 5 indicates an embodiment of the cable engaging member 6 of the burying device 1 according to the present invention wherein FIG. (a) is a frontal view while FIG. (b) a bottom view thereof. The sliding member 601 is engaged with the arm 3 which is projected forward from the burying device 1 and is made freely slidable in a horizontal direction by the driving gear 602. When the sliding member 601 is slid to the left by the driving gear 602, a void space is created at the position indicated by the arrow mark in FIG. (a) to which the cable 4 which has been caught by the cable catching member 5 (not shown) can be inserted from beneath the sliding member 601 to be placed between the roller $605_1$ provided on the arm 3 and the roller $605_2$ provided on the sliding member 601. On the side of the arm 3, on the other hand, there are provided a driving motor 603 and transmission gears $604_1$ and $604_2$. The cable 4 is made to be rolled in or out of the cable engaging member 6 by the rotation of the roller $605_1$ which is interlocked with the rotation of the transmission gears $604_1$ and $604_2$ which are driven to rotate by the driving motor 603. The cable 4 is effectively fed into the trench formed by the trenching member 7 by this roll-in/roll-out mechanism. The revolution of the driving gear 603, too, is controlled through the control cable 8 aboard the mother ship.

As is specifically described referring to preferred embodiment shown in the drawings, the present invention is advantageous in many aspects such as that cables can be buried effectively by an operation ship with equipments simpler than those used to be needed for the mother ship in prior art, that a cable can be accurately guided into a trench since the burying device advances with cables held therein, and lastly that, therefore, even if the marine bed is so soft that the tractive force necessary for the burying operation can not be obtained by driving the travelling member on an endless track, the tractive force can be supplemented to meet the requirement by rolling in the cable. The present invention is further advantageous in that the position of the cable can be readily adjusted, if necessary, in the preparatory operation before the burying operation simply by moving the burying device alone, which holds the cable therein, forward and backward or by rolling-in or rolling-out the cable without operating the trenching device. Moreover, it is possible to accurately guide the cable into the bottom of the trench by rolling-in the cable to reduce the tensile strength if the tensile strength on the cable becomes too strong and prevents the cable from properly being placed on the bottom of the trench.

What is claimed is:

1. An underwater cable burying device comprising a body, a travelling device provided on the device body, a trenching device provided on the middle portion of said body, an arm extending forward from said body, a cable clamp member and a cable engaging member provided on said arm, said cable clamp member comprising two semi-cylindrical claws fixed on a support frame supported by the arm at the upper portions thereof and which are made to open and close around a fulcrum by sliding a sliding member vertically, said claws being formed horizontally at the lower side thereof, and there being provided pressure boards above said claws biased by springs and a potentiometer rotated by lateral sliding movement of said pressure boards, and said respective devices being controlled from a mother ship through a control cable.

2. An underwater cable burying device comprising a body, a travelling device provided on the device body, a trenching device provided on the middle portion of said body, an arm extending forward from said body, a cable clamp member and a cable engaging member provided on said arm, said arm in said cable engaging member being engaged with a sliding member which is horizontally displaceable and said cable being made to be inserted between a roller provided on said arm and a roller which is interlocked with the revolution of a driving motor, and said respective devices being controlled from a mother ship through a control cable.

* * * * *